Oct. 17, 1950     C. F. GAGE     2,525,890
TETHERING DEVICE
Filed July 16, 1949
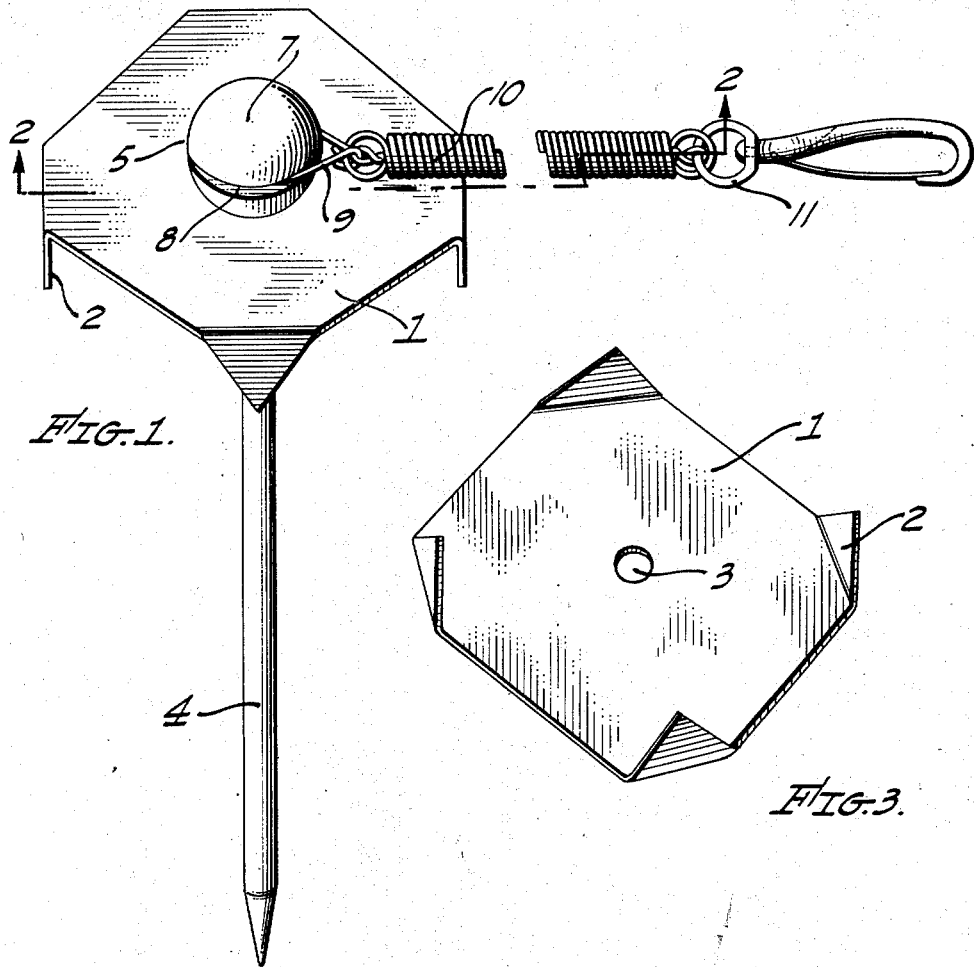
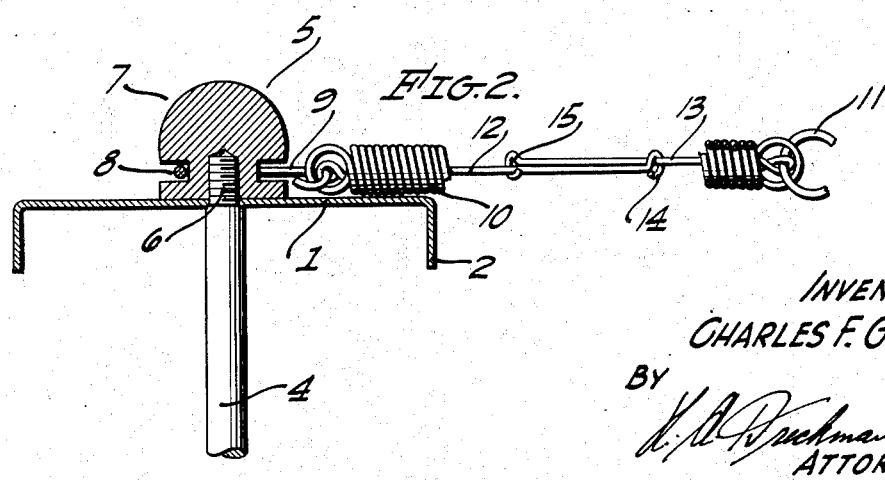
INVENTOR.
CHARLES F. GAGE,
BY
ATTORNEY.

Patented Oct. 17, 1950

2,525,890

UNITED STATES PATENT OFFICE 2,525,890

TETHERING DEVICE

Charles F. Gage, Long Beach, Calif.

Application July 16, 1949, Serial No. 105,127

5 Claims. (Cl. 119—121)

This invention relates to a tethering device for securing animals, and more particularly small animals, such as dogs.

I am aware that there are many types of tethering devices, including a stake driven into the earth to which an animal is tied, and other less known devices, such as, for example, a cylinder or a collar resting on a plate and revolving around one end of a post, the other end being driven into the earth. All of these earlier devices, of which I am familiar, have serious disadvantages in that the revolving parts are exposed to damage, causing them to not function properly or rendering them useless, particularly a bending or distorting of the post which forms their axis, or a bending or tilting of the plate upon which they rotate.

It is an object of this invention to provide a novel, improved, efficient tethering device that will reduce shock to the tethered animal when lunging or otherwise exerting sudden or violent force against its leash.

It is also an object to provide a tethering device that will allow the animal freedom of movement in a circular area of which its leash is a radius.

It is a further object to provide a tethering device that will prevent the tethered animal from entangling the leash by which it is secured.

It is also an object to provide a reliable tethering device of simple construction, which may be readily manufactured, attractive in design, convenient to use.

Other objects, advantages and features of invention may appear from the accompanying drawing, the subjoined detailed description and the appended claims.

In the drawing:

Figure 1 is a perspective view of my tethering device.

Figure 2 is a transverse sectional view taken on line 2—2 of Figure 1, with parts broken away.

Figure 3 is a perspective view of the plate.

Referring more particularly to the drawing, the numeral 1 indicates a flat substantially rectangular plate, the corners of which are all bent downwardly, as shown at 2, to form spikes which are driven into the ground for the purpose of providing a solid platform for the remaining structure of the tether.

A hole 3 is provided in the center of the plate 1, through which a spike or rod 4 extends. A head 5 is suitably fixedly secured to the top of the spike 4 and preferably by threading the upper end of the spike into the head, as shown at 6. The bottom of the head 5 is flat and rests on top of the plate 1, substantially as shown.

A hemispherical dome 7 is formed on the head 5 and below this dome I provide an annular channel 8. A loop 9 fits in the groove 8, and is freely rotatable in this groove. The loop 9 is attached to a coil spring 10 and a swivel hook 11 is attached to the outer end of this spring so that the animal's leash can be attached thereto.

To limit the extension of the spring 10, I provide a pair of wires 12—13, the wire 12 being attached at one end to the loop 9, and the wire 13 being attached at one end to the hooks 11. The wires 12—13 are slidably secured together and are limited in their sliding movement relative to each other by a loop 14 on the wire 12 which encircles the wire 13, and a similar loop 15 on the wire 13 which encircles the wire 12. It will thus be evident that the spring 10 can extend a limited amount and further extension is prevented by the wires 12—13, thus lunging of the animal will not unnecessarily stress the spring 10.

The spring 10 also cushions this lunging of the animal. In moving around the head 5, the animal will rotate the loop 9 and if the spring 10 strikes the dome 7 it will slide off of this dome, thus always providing an angular pull on the loop 9, causing this loop to swivel in the groove 8.

Having described my invention, I claim:

1. A tethering device comprising a flat rectangular plate, the corners of said plate being bent downwardly to form spikes to be driven into the ground, a post extending through the plate and driven into the ground, a head on the upper end of said post resting against said plate, a loop swivelly mounted on said head, a spring attached to said loop, and a hook attached to the outer end of said spring.

2. A tethering device comprising a flat rectangular plate, the corners of said plate being bent downwardly to form spikes to be driven into the ground, a post extending through the plate and driven into the ground, a head on the upper end of said post resting against said plate, a loop swivelly mounted on said head, a spring attached to said loop, and a hook attached to the outer end of said spring, and a hemispherical dome on said head.

3. A tethering device comprising a flat rectangular plate, the corners of said plate being bent downwardly to form spikes to be driven into the ground, a post extending through the plate, a head on the upper end of said post, said head resting on the top of the plate, said head having an annular groove therein, a loop fitted in said groove and rotatable therein, a spring secured at one end to the loop, and a hook on the outer end of said spring.

4. A tethering device comprising a flat rectangular plate, the corners of said plate being bent downwardly to form spikes to be driven into the ground, a post extending through the plate, a head on the upper end of said post, said head resting on the top of the plate, said head having an annular groove therein, a loop fitted in said groove and rotatable therein, a spring secured at one end to the loop, and a hook on the outer end of said spring, and a hemispherical dome on said head.

5. A tethering device comprising a flat rectangular plate, the corners of said plate being bent downwardly to form spikes to be driven into the ground, a post extending through the plate, a head on the upper end of said post, said head resting on the top of the plate, said head having an annular groove therein, a loop fitted in said groove and rotatable therein, a spring secured at one end to the loop, and a hook on the outer end of said spring, a pair of wires extending longitudinally through said spring, said wires being slidable one on the other, one of said wires being attached to said loop and the other of said wires being attached to said hook.

CHARLES F. GAGE.

No references cited.